UNITED STATES PATENT OFFICE.

WILLIAM MORRISON, OF DES MOINES, IOWA.

PROCESS OF BINDING THE ACTIVE MATERIAL OF POSITIVE-POLE LEAD ELECTRODES.

1,021,994.      Specification of Letters Patent.      Patented Apr. 2, 1912.

No Drawing.      Application filed February 23, 1912. Serial No. 679,301.

*To all whom it may concern:*

Be it known that I, WILLIAM MORRISON, a citizen of the United States, residing at Des Moines, in the county of Polk and State of Iowa, have invented certain new and useful Improvements in Processes of Binding the Active Material of Positive-Pole Lead Electrodes, of which the following is a specification.

This invention relates to the production of a permanent and insoluble binder for the active material of the positive-pole electrodes of lead storage batteries. This binder fundamentally comprises an oxygen compound of a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements, which can constitute the acidic radical of compounds having lead as a base. The three known metals which have these characteristics are tungsten, tantalum and niobium, otherwise called columbium.

To illustrate the invention, there will be described a process of producing a lead-peroxid electrode employing a compound of tungsten as the binder. For this purpose, a metallic support, for example a grid of antimonial lead, is pasted or filled with the usual mixture of minium, litharge and a sulfuric acid solution, in which mixture lead sulfate forms as a provisional binder. Complete formation, or peroxidation, of the active material is then preferably initially effected by placing the pasted grids, alternately with unfilled grids serving as dummy electrodes of the opposite polarity, in a sulfuric acid solution having a specific gravity of 1.200 to 1.250, and passing an electric current through the solution, alternately in opposite directions, until the paste has been sufficiently expanded, care being taken not to force the discharge beyond the normal intended capacity of the electrodes. The active material is now impregnated with the binder by either of the following methods: (1.) The electrode is dipped in a strong aqueous solution of sodium tungstate; is removed and is preferably dried or partially dried; is placed in a cell containing water, to which may be added a small amount of caustic soda, and an electric current is passed from the electrode through the water to a suitable cathode until all of the tungsten compound held in the active material is decomposed and the binder of an insoluble lead-tungsten-oxygen compound is formed. (2.) The electrode is dipped in a strong aqueous solution of sodium tungstate; is removed and preferably dried or partially dried; and is dipped in an aqueous solution of sulfuric acid containing a reagent capable, in this solution, of reducing lead peroxid and thereby causing the production of lead sulfate, preferably hydrogen peroxid, thereby impregnating the active material with a binder of a lead-tungsten-sulfur-oxygen compound. (3.) The electrode is dipped in a strong aqueous solution of sodium tungstate; is removed and preferably dried or partially dried; is dipped in an aqueous solution of hydrogen peroxid; and is removed and dipped in an aqueous solution of sulfuric acid, thereby precipitating the lead-tungsten-sulfur oxygen binder compound.

Either of the above methods may be repeated, to impregnate the active material with an additional amount of a binder.

Each of the three methods described is applicable to the production of a binder compound containing tantalum or niobium instead of tungsten, by substituting a tantalic or niobic solution, preferably potassium hexatantalate or niobate, for the sodium tungstate solution.

I claim:

1. The process of binding the active material of positive-pole lead electrodes, which consists in saturating the material with a solution of a compound having in its acidic radical a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electro-negative elements, which can constitute the acidic radical of compounds having lead as a base, and then reacting on said compound to precipitate in said active material a binder consisting of a lead-tungsten-oxygen compound.

2. The process of binding the active material of positive-pole lead electrodes, which consists in saturating the material with a solution of a compound having in its acidic radical a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electro-negative elements, which can constitute the acidic radical of compounds having lead as a base, and then electro-chemically reacting on said compound to precipitate in said active material a binder consisting of a lead-tungsten-oxygen compound.

In testimony whereof I affix my signature in presence of two witnesses.

WILLIAM MORRISON.

Witnesses:
EUGENE A. BYRNES,
N. P. LEONARD.